United States Patent
Albers et al.

(10) Patent No.: US 7,968,170 B2
(45) Date of Patent: *Jun. 28, 2011

(54) COMPOSITE SINGLE PANE WINDOW FOR AN AIRCRAFT AND METHOD OF MAKING SAME

(75) Inventors: Robert G Albers, Kent, WA (US); Paul S Nordman, Renton, WA (US)

(73) Assignee: The Boeing Company, Chicago, IL (US)

(*) Notice: Subject to any disclaimer, the term of this patent is extended or adjusted under 35 U.S.C. 154(b) by 921 days.

This patent is subject to a terminal disclaimer.

(21) Appl. No.: 11/316,173

(22) Filed: Dec. 22, 2005

(65) Prior Publication Data

US 2007/0034743 A1    Feb. 15, 2007

Related U.S. Application Data

(63) Continuation-in-part of application No. 10/655,257, filed on Sep. 4, 2003, now Pat. No. 7,300,693.

(51) Int. Cl.
*B32B 3/24* (2006.01)
*B64C 1/14* (2006.01)

(52) U.S. Cl. ........ 428/138; 428/139; 428/140; 428/192; 428/34; 428/38; 52/204.62; 244/129.3; 244/119; 156/99; 156/242

(58) Field of Classification Search .................. 428/139, 428/138, 140, 192, 34, 38; 52/204.62; 244/129.3, 244/119; 156/99, 242
See application file for complete search history.

(56) References Cited

U.S. PATENT DOCUMENTS

| | | | |
|---|---|---|---|
| 690,101 A | 12/1901 | Cooper | 206/77.1 |
| 3,081,205 A * | 3/1963 | Shorr | 52/208 |
| 3,584,567 A * | 6/1971 | Roach | 454/73 |
| 4,489,123 A | 12/1984 | Schijve | |
| 4,935,291 A | 6/1990 | Gunnink | |
| 4,964,594 A | 10/1990 | Webb | |

(Continued)

FOREIGN PATENT DOCUMENTS

JP    10-36139    2/1998

(Continued)

OTHER PUBLICATIONS

Gail Bohnhoff-Hlavacek, (Boeing-IPC), Preliminary VISTA IP Summary, Jun. 12, 2003, 2 Pages.

(Continued)

*Primary Examiner* — William P Watkins, III
(74) *Attorney, Agent, or Firm* — Harness, Dickey & Pierce, P.L.C.

(57) ABSTRACT

A single pane window for use in a jet aircraft. The single pane window includes a plurality of metal sheets. A fiber reinforced resin at least partially surrounds the plurality of metal sheets. The fiber reinforced resin is transparent. A cutout is formed within each of the plurality of metal sheets, with the cutout being filled by the transparent resin during the manufacturing process. The cutout forms an optically transparent window portion of the single pane window. The single pane window is lightweight and strong enough to form a load bearing portion of a fuselage of a commercial aircraft into which it is incorporated, and also does not require the bulky and heavy frame structure that has traditionally been required on window structures of jet aircraft. The single pane window also enables even larger windows to be incorporated on aircraft without increasing the weight or cost associated with such windows.

21 Claims, 3 Drawing Sheets

U.S. PATENT DOCUMENTS

| | | | |
|---|---|---|---|
| 4,992,323 A | 2/1991 | Vogelesang et al. | |
| 5,039,566 A | 8/1991 | Skubic et al. | 428/113 |
| 5,128,678 A | 7/1992 | Novak | |
| 5,160,771 A | 11/1992 | Lambing | |
| 5,429,326 A | 7/1995 | Garesche | |
| 5,500,272 A | 3/1996 | Padden | 428/140 |
| 5,547,735 A | 8/1996 | Roebroeks | |
| 5,665,450 A | 9/1997 | Day et al. | |
| 5,721,034 A | 2/1998 | Seemann, III et al. | |
| 5,951,800 A | 9/1999 | Pettit et al. | |
| 5,988,566 A | 11/1999 | Meyer | 244/129.3 |
| 6,082,674 A | 7/2000 | White et al. | |
| 6,818,306 B2 | 11/2004 | Miller et al. | |
| 6,889,938 B1* | 5/2005 | Nordman | 244/129.3 |
| 7,028,950 B2* | 4/2006 | Salmon et al. | 244/129.3 |
| 7,300,693 B2* | 11/2007 | Albers et al. | 428/139 |
| 2003/0080251 A1 | 5/2003 | Anast | |
| 2003/0082341 A1 | 5/2003 | Chu | |
| 2004/0212959 A1 | 10/2004 | Rotta et al. | |
| 2005/0035478 A1 | 2/2005 | Sewell et al. | |
| 2005/0048260 A1 | 3/2005 | Modin et al. | |
| 2005/0051255 A1* | 3/2005 | Nordman | 156/108 |
| 2006/0108059 A1* | 5/2006 | Modin et al. | 156/252 |
| 2008/0078494 A1* | 4/2008 | Nordman | 156/168 |
| 2008/0131661 A1* | 6/2008 | Albers et al. | 428/139 |

FOREIGN PATENT DOCUMENTS

| | | |
|---|---|---|
| WO | WO 96/30203 | 10/1996 |
| WO | WO 00/20275 | 4/2000 |

OTHER PUBLICATIONS

H. Lin, et al., Temperature and Wavelength Dependent Transmission of Optically Transparent Glass Fibre Poly (methyl methacrylate) Composites, 1994, Chapman & Hall.

Hongy Lin et al., "The Effect of Fiber Annealing on the Properties of an Optically Transparent PMMA Composite", Composites Science and Technology 50 (1994), pp. 367-372.

Hongy Lin, et al., Aging Behavir of Optically Transparent Poly (Methyl Methacrylate) Composites, Polymer Composites, Oct. 1993, vol. 14, No. 5, pp. 402-409.

Hongy Lin, et al., Model for the Temperature Dependent Transmission of Optically Transparent Poly (methyl methacrylate) Composites, J. Mater. res., vol. 8, No. 2, Feb. 1993, pp. 364-370.

Hongy Lin, et al., Optical and Mechanical Properties of Optically Transparent Poly(methyl methacrylate) Composites, Polymer Engineering and Science, Mid-Mar. 1992, vol. 32, No. 5.

James R. Olson, et al., "Fabrication and Mechanical Properties of an Optically Transparent Glass Fiber/Polymer Matrix Composite", Journal of Composite Materials, vol. 26, No. 8/1992, pp. 1181-1192.

Kerang Han, Ben Wang, and Chun Zhang, Resin Infusion Process with Fiber Stiffner, Florida State University, Office of Research, Technology Transfer, Jun. 9, 2003, pp. 1-2.

Kevin D. Weaver et al., interfacial Bonding and Optical Transmission for Transparent Fiberglass/Poly (Methyl Methacrylate) Composites, Polymer Composites, Apr. 1995, vol. 16, No. 2.

Kevin D. Weavers et al., Preparation and Properties of Optically Transparent, Pressure-Cured Poly (Methyl Methacrylate) Composites, Polymer Composites, Dec. 1993, vol. 14, No. 6.

McNichols, Perforated Metal Products, Jun. 9, 2003, pp. 1-2.

TPI Technology, Inc., An Overview of the SCRIMP Technology, 2001, pp. 1-12.

TPI, the SCRIMP Advantage, Jun. 9, 2003, pp. 1-3.

Miller, Michael C. et al. "Optically Clear Structural Laminate", U.S. Appl. No. 10/931,781, pp. 1-27 (now U.S. Patent No. 7,303,700), Issued Dec. 4, 2007.

* cited by examiner

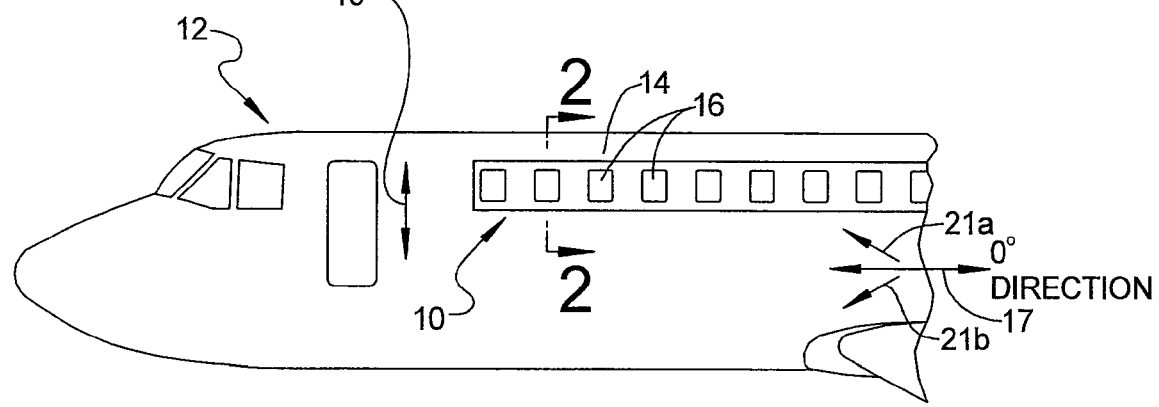
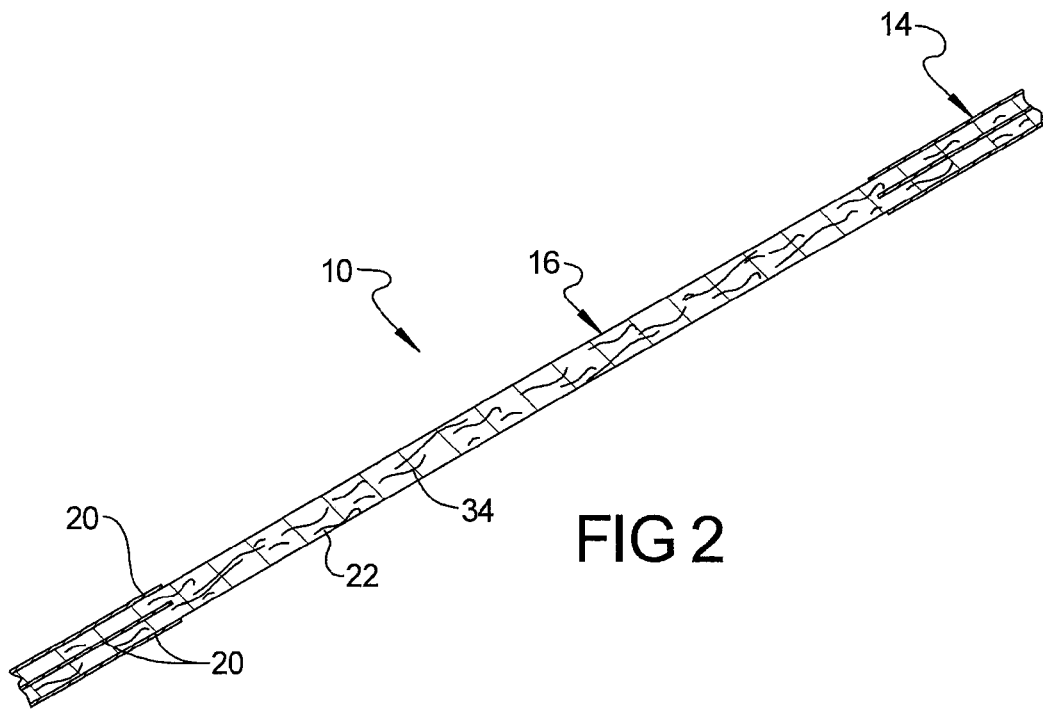

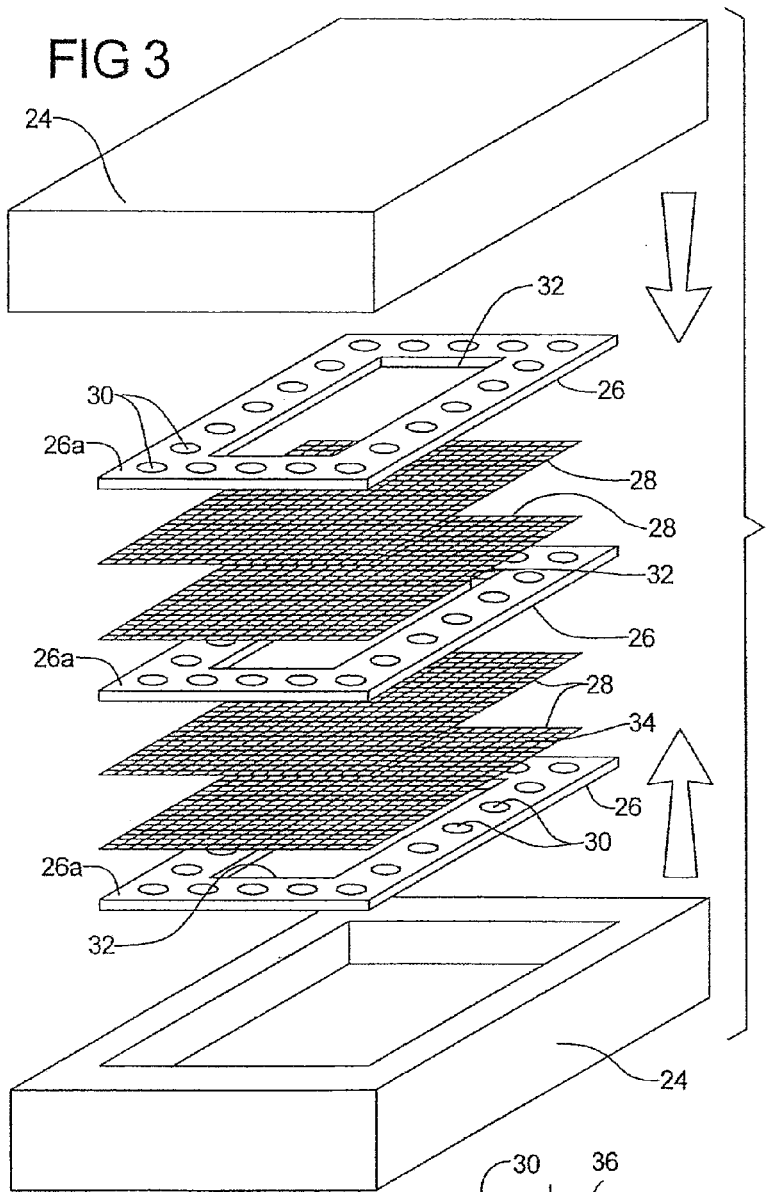
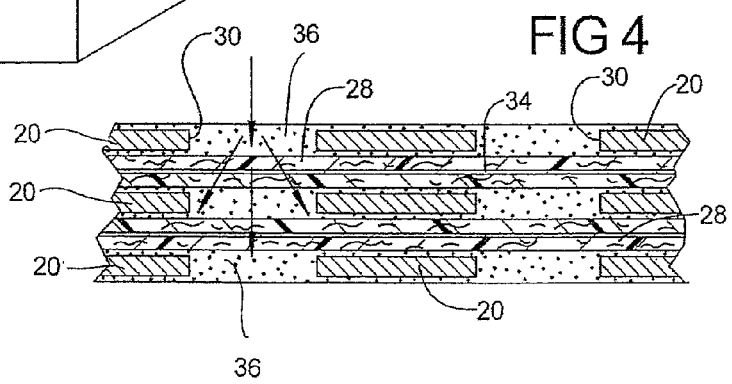

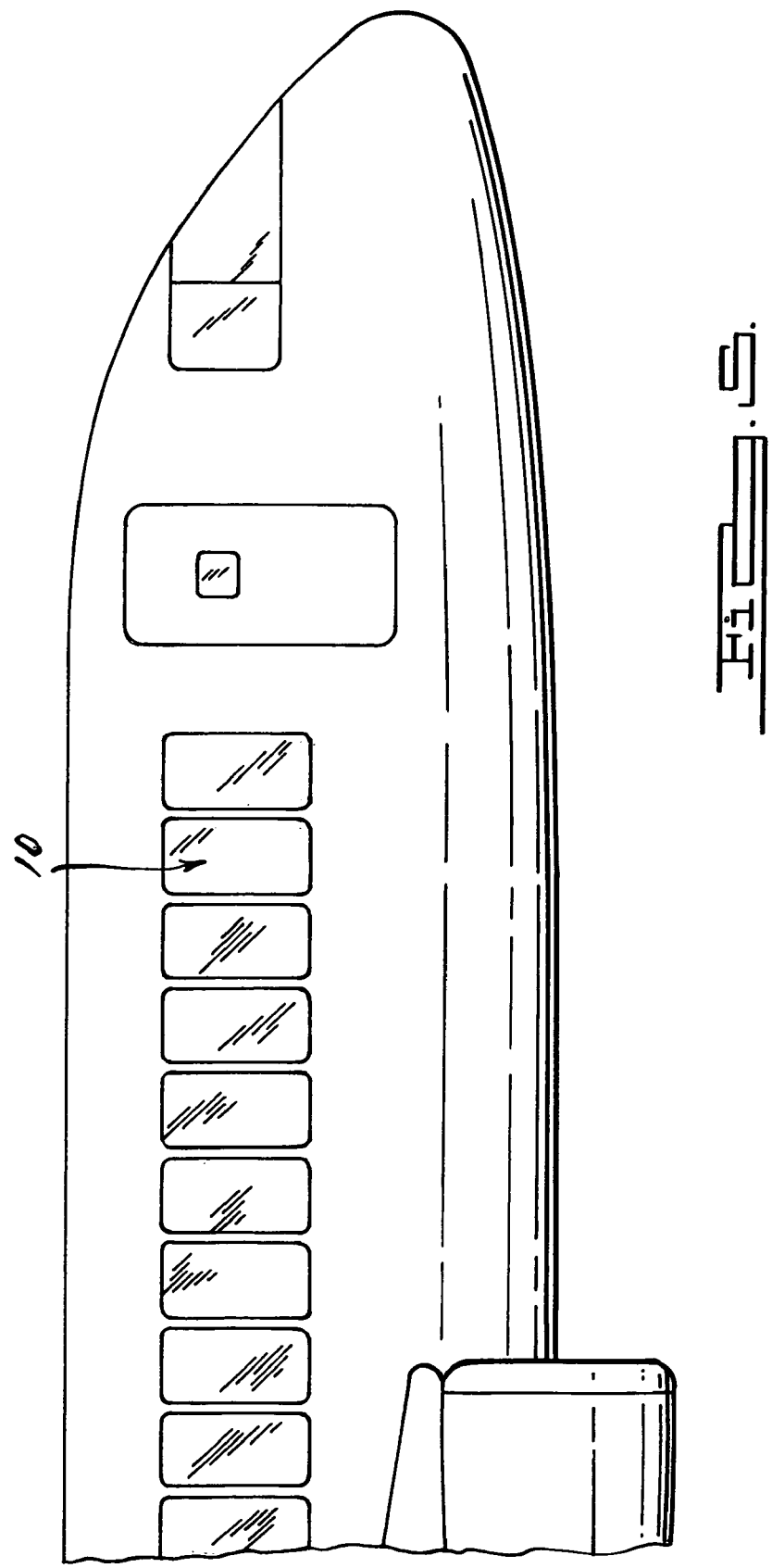

COMPOSITE SINGLE PANE WINDOW FOR AN AIRCRAFT AND METHOD OF MAKING SAME

CROSS-REFERENCE TO RELATED APPLICATIONS

This application is a continuation-in-part of U.S. patent application Ser. No. 10/655,257 filed on Sep. 4, 2003, now issued U.S. Pat. No. 7,300,693.

FIELD

The present disclosure relates to transparent aircraft skin panels and more particularly to a resin infused transparent skin panel that can be used to form a single pane window having sufficient strength to be used in aircraft applications and aerospace applications.

BACKGROUND

Passenger windows in most commercial aircraft are relatively small in size. This is due, in part, to the limited capabilities of current transparent window materials and also due to the heavy and complex support structure needed to support these windows within the frame of the aircraft. Such windows are typically double pane windows. The two panes are required to provide the needed damage tolerance due to the notch sensitivity of transparent plastics.

Typically, these transparent window materials consist of a transparent polymer. While very successful and exhibiting such useful qualities as high durability and easy formation of complex shapes, these polymer windows do have a limited strength capability.

Conventional windows also require heavy support structure in order to support the window within the structural skin of the aircraft. This support structure generally includes window forgings, and stringers. Each component is designed to strengthen the skin panel which surrounds and supports the window. However, each component added in turn increases the cost and weight of the completed window assembly, thereby providing an incentive to keep passenger windows relatively small. The need for including two panes when forming the window also adds to the overall weight of the aircraft, which in turn reduces the payload that the aircraft can carry, or alternatively requires greater fuel consumption for the aircraft.

Accordingly, it would be highly desirable to decrease the weight of current passenger window assemblies in modern aircraft. It would also be highly desirable to be able to form a single pane window having sufficient strength for use in commercial aircraft applications. Still further, it would be desirable to produce a single pane window that has sufficient structural strength, and is sufficiently light in weight, to provide a significantly increased viewing area over present day windows used on commercial aircraft. It would also be desirable to form a single pane window for use on commercial aircraft, in which the optically transparent area of the window has sufficient strength to function as a load bearing portion of the fuselage of the aircraft.

SUMMARY

A single pane window having sufficient structural strength to be used in aircraft applications and other aerospace applications. The window includes a transparent composite fiber layer that forms a window portion. The fibers of the composite fiber layer are infused with a resin that has an index of refraction matching that of the fibers. One or more layers of metal are secured around the periphery of the fiber layer to provide even further structural strength at those areas where the single pane window is to be secured within an opening in a fuselage of an aircraft. The single pane window is substantially lighter than a conventional double pane aircraft window, and still has the needed structural strength for demanding applications such as with commercial aircraft.

In one preferred embodiment, the single pane window is provided as a transparent skin panel for use in a mobile platform. The transparent skin panel includes a plurality of metal sheets. A fiber reinforced resin at least partially surrounds the plurality of metal sheets forming a fiber metal laminate. The fiber reinforced resin is optically transparent, and the fiber/resin transparent portion forms a composite assembly having excellent structural strength, while being light in weight. A cutout is formed within each of the plurality of metal sheets. The cutout corresponds to a window portion in the transparent skin panel, and the cutout is filled with the fiber material. The transparent skin panel allows windows having a significantly larger viewable area to be formed because of the strength and light weight of the composite construction of the optically transparent area of the skin panel.

A method of manufacturing a single pane window and a transparent skin panel is also provided. The method includes providing a mold. A preform of fibers and a metal sheet having a plurality of perforations are also provided. The preform and metal sheet are inserted in an open or closed mold such that the metal sheet and the preform are aligned one atop the other. A resin is then infused into the mold such that the resin flows through the perforations of the metal sheet and at least partially covers the metal sheet and the preform. The resin and preform of fibers are substantially transparent. The resulting assembly is a single pane window or a skin panel having an optically transparent portion that forms a single pane window.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 1 is a partial view of a front of an aircraft having a single pane window constructed according to one embodiment of the present disclosure;

FIG. 2 is a side cross sectional view of the single pane window taken in the direction of arrow 2-2 in FIG. 1;

FIG. 3 is an exploded perspective view of the materials used to construct the single pane window of FIG. 2;

FIG. 4 is a cross sectional view of a portion of the single pane window of FIG. 2 illustrating the layering and resin flow during the construction of the window; and FIG. 5 is a simplified side view of a portion of a commercial aircraft incorporating a plurality of enlarged, single pane windows of the present disclosure.

DETAILED DESCRIPTION OF THE PREFERRED EMBODIMENTS

The following description of the preferred embodiment(s) is merely exemplary in nature and is in no way intended to limit the disclosure, its application, or uses.

Referring to FIG. 1, there is illustrated a single pane window 10 constructed according to the principles of the present disclosure shown mounted to an aircraft 12. The single pane window 10, because of its structural strength, can also be viewed as a skin panel having an optically transparent portion (i.e., a window portion). The single pane window 10 includes a skin portion 14 and a window portion 16 that form a portion of a fuselage 15 of the aircraft 12. While in the particular example provided the single pane window 10 is illustrated as forming a side window of a commercial aircraft 12, it is to be understood that the single pane window 10 may be used in any portion of the aircraft 12 and may form a cockpit window, a side window, a door, or an unbroken surface. A principal advantage of the window 10 is that it forms a single pane window, rather than a dual pane window typically required in commercial aircraft applications. This significantly reduces the weight of the fuselage of a commercial aircraft when the single pane window 10 is incorporated in the fuselage, as compared to the weight of the fuselage if conventional double pane windows were to be used in the fuselage construction. However, the single pane window 10 is still strong enough to form a structural, load bearing portion of the fuselage.

With reference to FIG. 2, the single pane window 10 is coupled to a structural frame component (not shown) of the aircraft 12. Skin portion 14 includes a plurality of metal sheets 20 and at least one composite layer of material made up of a fiber reinforced resin 22. The metal sheets 20 are sandwiched between layers of the fiber reinforced resin 22. In the particular example provided, three metal sheets 20 are illustrated. It is to be understood, however, that a greater or lesser number of metal sheets 20 may be used as are desired. Moreover, while the metal sheets 20 are illustrated as spaced on each side of the fiber reinforced resin 22 and within the fiber reinforced resin 22, the metal sheets 20 may be located anywhere within the fiber reinforced resin 22, as will be described in greater detail below. The single pane window 10 has an allowable tension strength of about 50,000 pounds per square inch per ply of fiber reinforced resin, making it well suited for commercial aircraft and aerospace applications.

The window portion 16 is preferably comprised solely of the fiber reinforced resin 22. The fiber reinforced resin 22 is optically transparent for allowing viewing therethrough as will be described in greater detail below. The window portion 16 may vary significantly in thickness, depending upon where the window portion is located on an aircraft. However, typical thicknesses ranging from approximately 0.25 inch-0.50 inch (6.35 mm-12.7 mm) will most often be employed. The thickness of the window portion 16 will need to be the greatest when the window portion is located at those areas of the fuselage of a commercial aircraft over the wings, and least when the window portion is located close to the nose and tail of the aircraft.

Turning now to FIG. 3, the method of constructing the single pane window 10 will now be described. A mold 24 is provided, illustrated schematically in FIG. 3, capable of receiving the components of the single pane window 10. The mold 24 has a cavity (not shown) shaped to form the outer surface of the single pane window 10. This shape, while illustrated as essentially rectangular and flat in FIGS. 1 and 2, may be any shape such as, for example oval, round, rectangular, and/or slightly curved. It will be understood that in many aircraft applications, the single pane window 10 will ideally be made with a slight curvature to match the curvature of the fuselage into which the window 10 will be integrated.

A plurality of metal sheets 26 and a plurality of fiber preforms 28 are then provided. The metal sheets 26 include a plurality of perforations 30 formed therethrough. The perforations 30 are illustrated as circular although any size or shape may be employed. Each metal sheet 26 includes a cutout 32 in the center thereof. The cutout 32 in each metal sheet 26 corresponds to the window portion 16 of the assembled single pane window 10. Again, while the cutout 32 is illustrated as circular, it may form essentially any required shape including, for example, oval, round, rectangular or square. The metal sheets 26 are preferably made of aluminum due to its light weight and high strength, although various other metals may be employed including, for example, titanium.

The fiber preforms 28 each include a plurality of fibers 34 woven together to form a fiber mesh. The orientation of the plies is based on the desired directional strength of the resulting structure. For commercial aircraft applications, in order to carry the loads in the fuselage, fibers are arranged in many orientations. Typical layup orientations are designated in degrees with 0 degrees being along the longitudinal axis of the fuselage (i.e., arrow 17 in FIG. 1) and 90 degrees being around the circumference of the fuselage (arrow 19 in FIG. 1). More preferably, about 25% of the plies are oriented in the 0 degree direction, 25% in the 90 degree direction, 25% in the +45 degree direction (i.e., along arrow 21a in FIG. 1) and 25% in the −45 degree direction (i.e., along arrow 21b in FIG. 1). The fibers, in one preferred form, are comprised of a weave of glass fibers.

The metal sheets 26 and fiber preforms 28 are then inserted into the mold 24 in an order corresponding to the desired order of sheets in the single pane window 10. In the particular example provided, the metal sheets 26 alternate with double layers of the fiber preforms 28.

The mold 24 is then either closed, or a vacuum bag is applied and a resin is infused into the mold using a process such as Controlled Atmospheric Pressure Resin Infusion (CAPRI), Seemann Composite Resin Infusion Molding Process (SCRIMP™), Vacuum Assisted Resin Transfer Molding (VARTM), Resin Transfer Molding (RTM), or Resin Film Infusion (RFI). Any other suitable methods of infusing resin into the mold 24 not listed herein may also be employed.

As best seen in FIG. 4, the resin, indicated by reference numeral 36, flows in the direction of the arrows through the perforations 30. The resin 36 moves through the fiber preforms 28, thereby fully wetting (e.g. fully covering and saturating) the fibers 34. The single pane window 10 is then cured over a period of time until the resin 36 hardens. The mold 24 is then opened and the single pane window 10 removed. The metal sheets 26 correspond to the metal sheets 20 (FIG. 2) and the resin 36 and fiber preforms 28 correspond to the fiber reinforced resin 22 (FIG. 2).

Preferably the resin 36 is an aliphatic epoxy which is resistant to ultraviolet degradation. However, other alternate resin materials may be employed. To impart transparency, the resin 36 is optically transparent and the fibers 34 are also substantially optically transparent. The index of refraction of the fibers 34 is matched to the index of refraction of the resin 36. In this way, the single pane window 10 is fully optically transparent in the areas of the cutouts 32 in the metal sheets 26.

By integrally forming the transparent reinforced resin 22 with the metal sheets 20, a solid and high strength single pane window 10 is provided. Simultaneously, the heavy metallic support structure typically used to frame aircraft windows is substantially eliminated, thus reducing the weight of the aircraft. This in turn allows for larger windows to be employed, if desired, without increasing the cost and weight of the aircraft.

Referring to FIG. 5, an aircraft 100 incorporating a plurality of the single pane windows 10 is shown. In this example, the single pane windows 10 have enlarged, optically transparent window portions. By "enlarged", it is meant that the windows 10 are significantly larger than conventional windows used on commercial jet aircraft. It will also be appreciated that while the windows 10 are illustrated as vertically rectangular oriented windows, that a wide variety of other shapes such as square, oval, round, etc., could be employed.

While the present disclosure has been described in connection with aircraft windows, it will be appreciated that the disclosure can be incorporated on other forms of mobile platforms such as buses, trains, ships, etc., where composite panels may be employed, or even on fixed structures where lightweight, structurally strong windows are needed. Furthermore, while the single pane window is expected to find wide applicability in commercial jet aircraft applications, it is equally well suited for military aircraft applications. Essentially, any application where it is important to minimize the weight of the mobile platform, but without compromising the structural strength of the frame or fuselage structure of the mobile platform, is expected to benefit from the use of the single pane window 10 described herein.

The above description is merely exemplary in nature and, thus, variations of the described embodiments that do not depart from the gist of the disclosure are intended to be within the scope of the disclosure. Such variations are not to be regarded as a departure from the spirit and scope of the disclosure.

What is claimed is:

1. A single pane window suitably strong to be used as a window in a fuselage of a commercial jet aircraft, the single pane window comprising:
    an optically transparent composite portion comprised of at least one fiber preform layer;
    the fiber preform layer including a first plurality of fibers oriented parallel to a longitudinal axis of the fuselage of the commercial jet when the single window pane is integrated into the fuselage, and a second plurality of fibers oriented non-parallel to the first plurality of fibers;
    a resin saturating the fiber preform, the resin having an index of refraction at least approximately matching that of the fiber preform; and
    a plurality of layers of metallic material integrally formed during manufacture with the optically transparent composite portion about a peripheral portion of the optically transparent composite portion to form a unitary, integral window assembly;
    at least one of the layers of metallic material forming a single piece, rectangular component with a central opening and a plurality of holes formed in the at least one layer of metallic material, the holes being arranged around the central opening, the holes enabling the resin to engage therein during manufacture of the single pane window;
    the metal layers enabling securing of the single pane window within an opening in a fuselage of the aircraft.

2. The single pane window of claim 1, wherein the single pane window has an allowable tension of about 50,000 pounds per square inch per ply of fiber reinforced resin.

3. The single pane window of claim 1, wherein the resin comprises an aliphatic epoxy.

4. The single pane window of claim 1, wherein the optically transparent composite portion comprises a first surface and a second, the first surface facing and being exposed to an interior cabin area of the aircraft, and the second surface being exposed to an ambient environment outside of the aircraft.

5. The single pane window of claim 1, wherein the single pane window operates to form a load bearing structural portion of the fuselage of the aircraft.

6. The system of claim 1, wherein the plurality of layers of metallic material are configured to sandwich a peripheral portion of the optically transparent composite portion.

7. The single pane window of claim 1, wherein the optically transparent composite portion has a thickness of at least about 0.25 inch (6.35 mm).

8. The single pane window of claim 1, wherein the optically transparent portion has a thickness of 0.25 inch to 0.50 inch (6.35 mm-12.7 mm).

9. The single pane window of claim 1, wherein the optically transparent composite portion includes first and second surfaces, the first surface facing an interior cabin area of the aircraft, and a second surface being exposed to an ambient environment outside of the aircraft.

10. The single pane window of claim 1, wherein:
    the second plurality of fibers forms a second ply arranged generally perpendicular to the first plurality of fibers.

11. The single pane window of claim 1, wherein the second plurality of fibers of the fiber preform layer includes fibers arranged to extend generally perpendicular to the first plurality of fibers.

12. The single pane window of claim 11, wherein the fiber preform layer further comprises a third plurality of fibers forming a third ply arranged at an approximate +45 degree angle relative to the first plurality of fibers.

13. The single pane window of claim 12, wherein the fiber preform layer further comprises a fourth ply having a fourth plurality of fibers arranged at an approximately −45 degree angle relative to the first plurality of fibers.

14. A single pane window suitably strong to be used as a window in a fuselage of a mobile platform, the single pane window comprising:
    an optically transparent composite portion comprised of at least one fiber preform layer;
    the fiber preform layer including a first plurality of fibers oriented parallel to a longitudinal axis of the fuselage of the commercial jet when the single window pane is integrated into the fuselage, and a second plurality of fibers oriented non-parallel to the first plurality of fibers;
    a resin saturating the fiber preform, the resin having an index of refraction at least approximately matching that of the fiber preform; and
    at least one layer of metallic material integrally formed during manufacture with the optically transparent composite portion about a peripheral portion of the optically transparent composite portion to form a unitary, integral window assembly;
    the at least one layer of metallic material forming a single piece, rectangular component with a central opening and a plurality of holes arranged around the central opening, the holes enabling the resin to engage therein during manufacture of the single pane window;
    the at least one layer of metallic material enabling securing of the single pane window within an opening in the fuselage of the mobile platform.

15. The single pane window of claim 14, wherein the layer of metallic material is configured to help sandwich a peripheral portion of the optically transparent composite portion.

16. The single pane window of claim 14, wherein the optically transparent composite portion has a thickness of at least 0.25 inch (6.35 mm).

17. The single pane window of claim 14, wherein the optically transparent portion has a thickness of 0.25 inch to 0.50 inch (6.35 mm-12.7 mm).

18. The single pane window of claim 14, wherein the optically transparent composite portion includes first and second surfaces, the first surface facing an interior cabin area of the aircraft, and a second surface being exposed to an ambient environment outside of the aircraft.

19. The single pane window of claim 14, wherein:
the second plurality of fibers forms a second ply arranged generally perpendicular to the first plurality of fibers.

20. The single pane window of claim 19, wherein the fiber preform layer further comprises a third plurality of fibers forming a third ply arranged at an approximate +45 degree angle relative to the first plurality of fibers.

21. The single pane window of claim 20, wherein the fiber preform layer further comprises a fourth ply having a fourth plurality of fibers arranged at an approximately −45 degree angle relative to the first plurality of fibers.

* * * * *